April 8, 1930.    S. D. PORT    1,754,043
CONNECTING LINK FOR CHAINS
Filed June 13, 1929

INVENTOR.
S. D. PORT,
BY
Shepherd & Campbell
ATTORNEYS

Patented Apr. 8, 1930

1,754,043

UNITED STATES PATENT OFFICE

SIDNEY D. PORT, OF SAXTON, PENNSYLVANIA

CONNECTING LINK FOR CHAINS

Application filed June 13, 1929. Serial No. 370,625.

This invention relates to connecting links for chains, and it has for its object to provide a structure of an extremely simple and inexpensive nature, by means of which two chain links may be easily and quickly connected or disconnected.

In the accompanying drawing.

Like numerals designate corresponding parts in all of the figures of the drawing.

Figure 1:
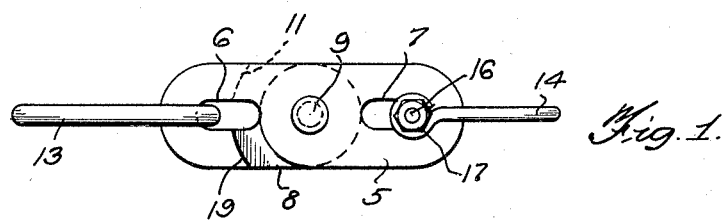
Figure 1 is a side elevation looking from the body link side of the connector.
Figure 2:
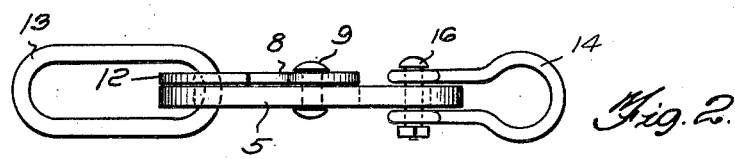
Figure 2 is a plan view thereof.
Figure 3:
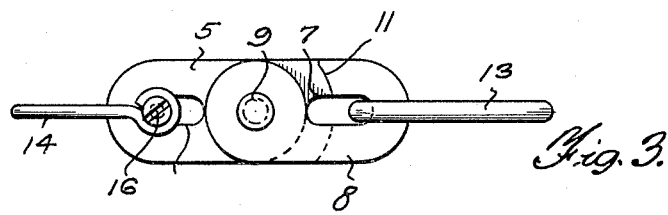
Figure 3 is a side elevation looking from the lock link side of the connector.
Figure 4:
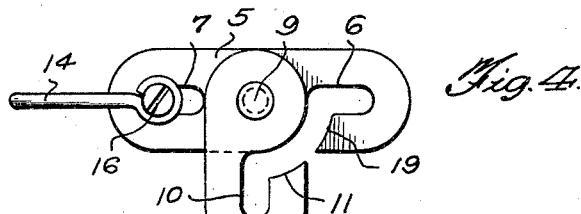
Figure 4 is a view like Figure 3, but with the lock link moved to open position.

Referring to the drawing, and particularly to Figures 1 to 4, it will be seen that the connector comprises a body link 5, having the elongated slots 6 and 7 formed therein, adjacent the opposite ends thereof. A lock link 8 is pivoted at 9 to the body link. This lock link is provided with an elongated slot 10, which is adapted to align with the slot 6 of the body link, said slot 10, communicating with a lateral passageway 11, which opens at the outer edge of the lock link and causes said lock link to present a hook-like terminal 12. The chains to be connected are indicated at 13 and 14, and may be simple links, such as are illustrated at 13, or may comprise elements of U-shape, as indicated at 14, the legs of which are connected by a bolt 16, having a nut 17 thereon, said bolt passing through slot 7.

It is to be noted that the slot 7 is closed. Thus, in disconnecting the chain, there is no possibility that the connector may drop off of the chain and become lost. When the chain is to be disconnected, link 13 is moved inwardly to bring it to the inner end of the slot 6, and into alignment with the passage 11 of the lock link. The lock link may then be swung outwardly to the position illustrated in Figure 4, after which the chain link 13 may be disconnected from the body link by being moved outwardly through lateral passageway 19, which extends from the slot 6 to the outer edge of the body link.

Figures 5, 7:
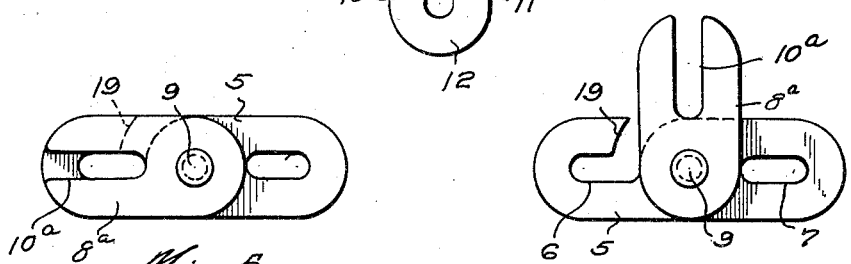
Figure 5 is a side elevation of a modified form of the invention, looking from the lock link side of the structure.
Figure 7 is a view like Figure 5, with the lock link moved to open position.
Figure 6:
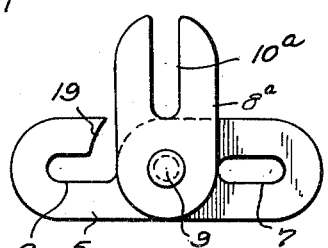
Figure 6 is a plan view of the structure of Figure 5.

In the form of the invention illustrated in Figures 5, 6 and 7, the body link is the same as the body link of the remaining figures, and the same reference characters have been applied. In this form of the invention the lock link 8$^a$ is pivoted at 9 to the body link, and is provided with a straight slot 10$^a$, which opens at the end of the link. In disconnecting the chain with this form of the device, the chain link is moved to the inner end of the slot 6 of the body link, and into alignment with the lateral passageway 19 of said body link, and then the chain link and the lock link are moved outwardly together to bring the lock link to the position illustrated in Figure 7, the chain link passing out through passageway 19.

It is clear that the chain link will slip very readily out of the straight slot 10$^a$.

It is to be understood that the invention is not limited to the precise construction set forth, but that it includes within its purview whatever changes fairly come within either the terms or the spirit of the appended claims.

Having described my invention, what I claim is:

1. A connector of the character described, comprising an elongated body link having a closed longitudinal slot adjacent one end thereof, and an elongated slot and a lateral passageway from the inner end of said slot at the other end thereof, and a lock link having its inner portion pivoted to the body link, one end portion only of the lock link having a longitudinal slot and a lateral passageway formed therein at the inner end of said slot, said slot of the lock link aligning with the corresponding slot of the body link.

2. A device of the character described, comprising an elongated body link having a closed elongated slot therein, adjacent one end thereof, and a longitudinal slot with a lateral passageway leading from the inner end thereof, at the other end thereof, and a shorter lock link pivoted at one of its ends to substantially the central portion of the body link and having a slotted end extension, the slot of which aligns with the slot of the body link, said lock link being of such shape and dimension as to conform to the shape of the body link at one end of the structure, but being short enough to leave the slot at the other end of the body link uncovered.

3. A connector of the character described, comprising an elongated body link having a chain link positively engaged with one end thereof, an elongated slot therein adjacent the other end thereof, a lock link having its inner end portion pivoted to the body link, one end portion only of the lock link having a longitudinal slot formed therein, arcuate passageways concentric with the pivot of the lock link extending from the inner ends of the elongated slots of the body and lock links respectively, but in opposite directions, as and for the purposes set forth.

In testimony whereof I affix my signature.

SIDNEY D. PORT.